United States Patent Office 3,037,914
Patented June 5, 1962

3,037,914
BACTERIAL PRODUCTION OF TRIAMCINOLONE BY BACTERIAL FORMULATIONS
Louis I. Feldman, Spring Valley, and Barbara E. Nielsen and John H. Mowat, Pearl River, N.Y., assignors to American Cyanamid Company, New York, N.Y., a corporation of Maine
No Drawing. Filed May 6, 1960, Ser. No. 27,256
18 Claims. (Cl. 195—51)

This invention relates to the dehydrogenation of steroids. It is concerned primarily with a novel method of dehydrogenating steroids such as those of the pregnane series by means of a novel microbiological fermentation. Still more particularly, it deals with such a procedure whereby a double bond is introduced in the 1,2-position.

For the purposes of this discussion, the rings of the steroid structure with which the invention is concerned are designated as A, B, C and D respectively and the several positions are numbered as shown in the following diagram:

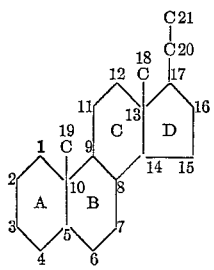

A number of steroids of the pregnadiene series, such as 1-dehydrohydrocortisone, for example, are becoming increasingly important either as therapeutic agents or/as intermediates in the preparation of other therapeutically useful steroids. Such compounds, which are obtained by the practice of the present invention, are useful in anti-inflammatory agents in the treatment of arthritis, asthma, burns, bursitis, and the like, and also in the treatment of skin disorders and collagen diseases. As such these compounds are used in combination with fillers, excipients, etc., in tablets, powders, pills, etc. They can also be used parenterally in a solution or in a suspension.

In accordance with the present invention, it has been found that very useful steroids of the 1,4-pregnadiene series can be prepared by the use of *Bacterium havaniensis* to accomplish the desired dehydrogenation in ring A of such steroids. The type of reaction obtained in the process of the present invention can be illustrated, for example, in the following equation:

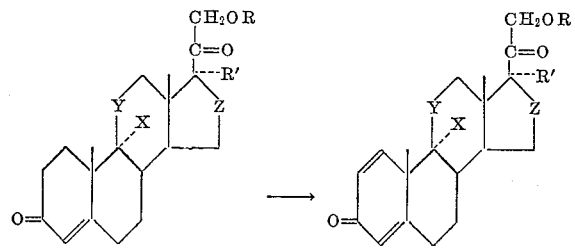

in which X is hydrogen or halogen, Y is methylene, hydroxymethylene, or carbonyl, Z is methylene, hydroxymethylene, or lower alkanoyloxymethylene, R' is hydrogen or hydroxyl and R is hydrogen or lower alkanoyl.

In carrying out the process of the present invention, the organism is cultivated aerobically in a suitable nutrient medium with a $\Delta^4$-steroid of the pregnene series. During the growth of the organism under favorable conditions, two hydrogen atoms are eliminated from steroid ring A, and a double bond is thereby obtained in the 1,2- position. The exact mechanism of this dehydrogenation is not wholly certain. It is thought to be caused by enzymes produced by the organism in the process of growth.

A suitable nutrient medium contains a soluble source of carbon, nitrogen, and mineral elements. In general, the preparation of such media is well known and the practice of the present invention in this respect may follow such procedures.

Illustrative sources of carbon include sugars, such for example as glucose, sucrose, maltose, dextrose, xylose, galactose, and the like; alcohols, such as glycerol or mannitol; starches such as corn starch and the like; various organic acids, such as citric, malic and acetic acids; various natural products containing carbohydrates, such as corn steep liquor, soybean meal, cottonseed meal, and many other available materials which have been used heretofore as a source of carbon in fermentation processes. Usually a variety of the above can be employed in the medium with good results.

As suitable sources of nitrogen, may be included in some of the above-named materials, such as corn steep liquor, soybean meal, cottonseed meal and the like. Various other substances may be utilized, as for example, beef extract, casein, yeast, enzymatically digested proteins, and degradation products, including peptones, amino acids, and many other available proteinaceous materials which have been found to be suitable in supporting the growth of bacteria. In organic sources of nitrogen, including urea, ammonium salts, nitrates, and the like, also may be used in the medium as a source of assimilable nitrogen to provide a favorable growth medium for the organism.

Mineral requirements of fermentation are usually supplied in the crude materials which are often used as sources of carbon and nitrogen or occur in the water available for use in the process. However, it is usually advisable to supplement the minerals normally present with added amounts to obtain an optimal growth. Cations and anions which may be desirable in added amounts include sodium, potassium, calcium, magnesium, phosphate, sulphate, chloride, cobalt, manganese, and various others. It is often desirable, also to provide such trace elements as boron, copper, cobalt, molybdenum, chromium and the like.

Growth of the organism takes place under aerobic conditions and suitable aeration, in flasks, for example, can be achieved by agitation on a reciprocating or rotary shaker or in bottles or tanks by forcing sterile air through the fermentation mixture. In good practice, sterile air should be available in the medium in a ratio to the medium in the range of from about 1:3 to about 2:1 volumes per minute. Agitation in bottles or fermenter tanks is provided by a mechanical impeller. While the organism will grow at temperatures of 5° and 45° C., it is preferable for optimum results to carry out the process of the present invention within a somewhat more limited temperature range of from about 25° to about 37° C.

To prepare inocula, 1.0 ml. of washed vegetative cell suspension of the bacterium is used to inoculate 100 ml. of sterile medium in a 500 ml. Erlenmeyer flask. An illustrative medium of this type contains the following: 1% cerelose, 0.1% yeast-extract (Difco), 0.4% of peptone (Bacto), sodium chloride 0.25% and beef extract (Armour) 0.4%. This mixture is adjusted to about pH 7 and sterilized for 15 minutes at a temperature of 120° C. (15 pounds steam pressure). This medium is used in the illustrative examples below. The inoculated flask is incubated at 37° C. on a shaker for about 4 to 8 hours. Such inocula may be used to inoculate larger batches of sterile medium in bottles, and such bottle cultures, after fermentation, may be used to inoculate large batches of medium in fermenter tanks. This procedure is given as a typical illustration only, and may be varied if necessary or desirable. For example instead of the Medium No. 13 described above, other known media may be used.

Typical Δ⁴-steroids of the pregnene series which can be usefully processed according to the present inventoin include for example 4-pregnene-11β,17α,21-triol-3,20-dione (hydrocortisone), 4-pregnene-11β,21-diol-3,20-dione (corticosterone), 4-pregnene-17α,21-diol-3,20-dione (Reichstein's Substance S), 4-pregnene-11α,17α,21-triol-3,20-dione (11-epi-hydrocortisone), 4-pregnene-11β,16α,17α,21-tetrol-3,20-dione, 9α-fluoro-4-pregnene-11β,16α,17α,21-tetrol-3,20-dione, 4-pregnene-16α,17α,21-triol-3,11,20-trione, 4-pregnene-17α,21-diol-3,11,20-trione; esters thereof, such as the acetate, and the like.

The amount of steroid added as substrate to the fermentation may be varied as necessary or desirable. However, a good practice will ordinarily be found on the order of about 0.05 to 1.0 gram per liter of nutrient medium.

When using such steroid substrates in the fermentation, the products formed are the free steroids. These steroids are generally added to the fermentation in a solution or in finely-divided form. A preferred method is to dissolve the steroid in ethanol or other water-miscible solvents and add it to the fermentation medium at the desired stage in the process. Although the steroid may precipitate from solution when so added, it is dispersed throughout the medium as a fine suspension and becomes readily available to the organism for oxidation.

During fermentation process, it may be found desirable to add an antifoaming agent. In such cases, commercially-available products may be used. These usually contain such agents as silicones, glyceride oils, and the like. These compounds are added from time to time and in the amounts needed.

In general, practice of the process of the present invention may be illustrated by the following procedure. About 10 ml. batches of inoculated medium are placed in 100 ml. shaker tubes and incubated, usually for a period of about 16 to 40 hours, at an average temperature of about 28° C. At this point, 2 mgm. of sterile substrate (4-pregnene steroid) dissolved in 0.2 ml. of ethanol is added to each tube. Fermentation is then continued, at about 28° C. for sufficient time to obtain maximum conversion of the 4-pregnene to the 1,4-pregnadiene. This period of time may vary from as little as about one hour to about 72 hours, or longer.

At the conclusion of fermentation, the product Δ¹,⁴-steroid of the pregnadiene series is recovered from the fermentation medium. This may be illustrated by the following procedure, which describes in particular a ten ml. fermentation. However, this is a general procedure, operative for fermentations of various sizes.

The contents of a fermentation tube are extracted with three volumes of a suitable solvent such as ethyl acetate. The solvent phase is evaporated to dryness and the residue is then dissolved in a suitable solvent such as methanol, dimethylformamide or mixtures thereof. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steroid products from extracts may be accomplished by methods well understood by those skilled in the art. Separation and purification of a steroid mixture often requires the use of chromatography.

The process employed to identify the steroids present in the extracted fermentation beer previously described is by paper strip chromatography. A solvent system used is petroleum ether:benzene:acetic acid:p-dioxane prepared by shaking the solvents listed in the proportion 2:4:1:1 respectively in a separatory funnel and then allowing the two layers to separate. A portion of the lower layer is placed in an open dish on the floor of a large glass cylinder. The upper layer is the solvent phase and is used to fill the trough-shaped well within the cylinder. For comparison, a standard steroid solution is prepared by dissolving a known sample of steroid in dimethyl formamide. At least one standard steroid solution is chromatographed simultaneously each time an unknown solution is tested.

Exactly 0.010 ml. of the standard steroid test solution is applied to the paper strip at the starting line, four inches from the upper end of the strip, which is folded over the edge of the trough and immersed in the solvent phase within. This strip is then developed for 2 to 4 hours.

On another strip, 0.01 ml. of the unknown solution is similarly applied and this strip is then folded into the same trough, being developed simultaneously with the steroid standard strip. This use of the trough permits the simultaneous development of many strips. After proper development of the paper strips, they are removed from the apparatus and air dried. After drying, the strips are placed between a source of ultra-violet light and a zinc silicate coated plate. Steroids containing the Δ⁴-3 ketone conjugated system are observed as dark spots. In addition, the strips may be sprayed with an alkaline solution of Blue Tetrazolium, which develops color at the spots where the steroids containing an α-ketol grouping are present. Strips are lined up with at least one "standard" strip and the Rf determined. The different steroids can then be identified by their positions on the strips.

The desired Δ¹,⁴-steroids will be more polar than their corresponding Δ⁴-steroid. It should be understood, moreover, that the desired Δ¹,⁴-steroids, once they have been isolated and characterized, may themselves be used in a standard steroid solution for process improvement.

The present invention will be more fully described in conjunction with the following examples. They are intended as illustrations.

EXAMPLE 1

*Preparation of 9α-Fluoro-1,4-Pregnadiene-11β,16α,17α, 21-Tetrol-3,20-Dione*

A test tube agar slant of *Bacterium havaniensis* (ATCC No. 4001) is washed with 7 ml. of sterile 0.9% saline solution, and the resulting suspension is used to inoculate 100 ml. of sterile medium (Medium No. 13 as described hereinbefore) in a 500 ml. Erlenmeyer flask. The mixture is incubated on a reciprocating shaker for about seven hours at 37° C. One ml. portion of this culture is then used to inoculate 100 ml. lots of sterile medium in 500 ml. flasks and the inoculated flasks incubated for about 16 hours, at about 28° C.

At this time 20 mg. of 9α-fluoro-4-pregnene-11β,16α, 17α,21-tetrol-3,20-dione is dissolved in 1.0 ml. of methanol and added to each flask. The incubation is then continued for an additional 72 hours. A 5 ml. aliquot is extracted once with 15 ml. of ethyl acetate and the extract is evaporated to dryness under vacuum. The dry residue is taken up in a methanol-dimethylformamide mixture and an appropriate sample analyzed by the paper strip technique described hereinbefore. The results indicate that the solution contains principally 9α-fluoro-1,4-pregnadiene-11β,16α,17α,21-tetrol-3,20-dione.

EXAMPLE 2

*Preparation of 9α-Fluoro-1,4-Pregnadiene-11β,16α,17α, 21-Tetrol-3,20-Dione*

Twelve liters of sterile medium, pH-7, containing cerelose 1%, yeast extract (Difco) 0.1%, sodium chloride 0.25%, beef extract (Difco) 0.4% and peptone (Difco) 0.4% in a stirred aerated 20 liter fermenter is inoculated with 200 ml. of cells of *Bacterium havaniensis* (ATCC 4001) grown for 24 hours in the same medium.

Fermentation is carried out under the following conditions.

Aeration rate_____ 12 liters of air per minute.
Agitation speed_____ 400 r.p.m.
Temperature_____ 28° C.

Twenty-four hours after inoculation 3.0 g. of 9α-fluoro-4-pregnene-11β,16α,17α,21-tetrol-3,20-dione is added to the mash and fermentation is continued for another 24 hours. Thereafter fermentation mash is harvested. Paper chromatographic assays show a high yield of 9α-fluoro - 1,4 - pregnadiene - 11β,16α,17α,21 - tetrol - 3,20-dione, and only a trace of starting material.

EXAMPLE 3

*Isolation From Fermentation Mash*

The product of Example 2 is filtered and the mycelium pad is set aside. The filtrate (9 liters) is extracted with three 9 liter portions of ethyl acetate and the extracts pooled. The mycelium is slurried in 5 liters of water at 50–60° C. to dissolve out any additional steroid and resulting mixture is filtered. This filtrate is extracted with two 5 liter portions of ethyl acetate. All the ethyl acetate extracts are combined and washed with one tenth volume of water, the water was being discarded. The combined ethyl acetate solution is concentrated under vacuum to 1 liter, the concentrate stirred with three grams of activated carbon for 15 minutes, and filtered. The carbon cake is washed with fresh ethyl acetate and the washed cake discarded. The filtrate and washings are combined and concentrated to dryness at reduced pressure and room temperature. The residue is digested with ether and the solid removed by filtration. The weight after washing with ether and drying is 356 mg. The material is dissolved in a minimum amount of hot acetone, the solution filtered, concentrated to about 20 ml. and an equal volume of petroleum ether is then added. Resultant crystals formed are removed by centrifugation, washed with petroleum ether and dried. The yield is 300 mg. The melting point of this material was 253–255° C. (Fisher-Johns block, uncorrected), compared with an authentic sample of triamcinolone which melts at 254°–256° under the same conditions. The melting point of a mixture was also 253–255°. The Rf value by paper chromatography and the infrared absorption curve are identical with those of authentic 9α-fluoro-1,4-pregnadiene-11β,16α,17α,21-tetrol-3,20-dione.

In the following examples the product is identified by the procedure shown above in Example 3.

EXAMPLE 4

Under the same conditions, except that the harvest time is 7 hours, and the substrate is hydrocortisone, Example 1 is repeated. The product 1,4-pregnadiene-11β,17α,21-triol-3,20-dione is obtained in good yield.

EXAMPLE 5

Example 1 is repeated except that the substrate 9α-fluorohydrocortisone is used. The product Δ¹-9α-fluorohydrocortisone is obtained in good yield.

EXAMPLE 6

Example 5 is repeated using 9α-fluorohydrocortisone-21 acetate as the substrate. The products as the Δ¹-21-acetate and the Δ¹-free alcohol again are obtained in good yields. By permitting the fermentation to continue, one may obtain solely the Δ¹-free alcohol.

EXAMPLE 7

Example 1 is repeated except that the harvest time is 24 hours and 16α-hydroxyhydrocortisone is used as substrate. Δ¹-16α-hydroxyhydrocortisone is obtained.

EXAMPLE 8

Example 1 is repeated except that the harvest time is 2 hours and Reichstein's Substance S is used as substrate. The product as the Δ¹ analogue is obtained.

EXAMPLE 9

Example 1 is repeated except that the harvest time is 24 hours and 16α-hydroxy Reichstein's Substance S is used as substrate. The product is obtained as the Δ¹ analogue.

EXAMPLE 10

The same conditions as in Example 1 are used except that the harvest time is 2 hours and 16α-hydroxydesoxycorticosterone is used as substrate. The Δ¹ analogue is obtained.

EXAMPLE 11

The same conditions as in Example 1 are used except that the harvest time is 2 hours and 16α,17α-epoxy-DOC-21 acetate is used as substrate. The Δ¹ analogue is obtained.

EXAMPLE 12

The same conditions as in Example 1 are used except that the harvest time is 2 hours and 11α-hydroxyprogesterone is used as substrate. The Δ¹ analogue is obtained.

EXAMPLE 13

The same conditions as in Example 1 are used except that the harvest time is 2 hours and 11α-hydroxy-16α,17α-epoxyprogesterone is used as substrate. The Δ¹ analogue is obtained.

EXAMPLE 14

Example 13 is repeated using desoxycorticosterone as substrate. The product 1,4-pregnadiene-21-ol-3,20-dione is obtained.

EXAMPLE 15

Example 13 is repeated using as substrate 4-pregnene-3,20-dione. The product 1,4-pregnadiene-3,20-dione is obtained.

In the foregoing examples it will be noted that each has dealt with the introduction of a double bond into the 1,2-position of a Δ⁴-3-keto steroid. In other words, in the general type reactions in which the A ring undergoes a specific change. This change also can be illustrated for example in the following way:

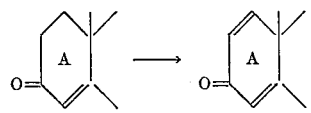

It is this change which characterizes the present invention.

We claim:
1. A process of introducing a 1,2-double bond into a steroid of the pregnane series which comprises subjecting said steroid to the fermentative action of *Bacterium havaniensis*.
2. A process according to claim 1 in which the steroid is selected from the group consisting of said steroids wherein the A ring has the formula:

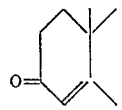

3. A process of preparing a 1,4-pregnadiene wherein the A ring has the structure:

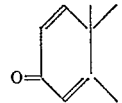

which comprises: in an aqueous medium, under submerged fermentation conditions, subjecting a steroid of the pregnane series wherein the A ring has the formula:

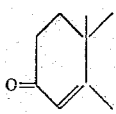

to the dehydrogenating activity of *Bacterium havaniensis*.

4. A process of introducing a 1,2-double bond into a steroid of the pregnane series which comprises: inoculating a nutrient medium containing assimilable carbon, nitrogen and mineral salts with *Bacterium havaniensis*; adding thereto said steroid of the pregnane series, continuing the resultant fermentative action on the steroid until a substantial amount of corresponding $\Delta^{1,4}$-3-ketosteroid of the pregnadiene series has been produced, and recovering said product therefrom.

5. A process according to claim 4 using *Bacterium havaniensis*, ATCC No. 4001.

6. A process according to claim 4 in which the substrate steroid is 4-pregnene-11β,17α,21-triol-3,20-dione, and the recovered product is 1,4-pregnadiene-11β,17α,21-triol-3,20-dione.

7. A process according to claim 4 in which the substrate steroid is 9α-fluoro-4-pregnene-11β,17α,21-triol-3,20-dione and the recovered product is 9α-fluoro-1,4-pregnadiene-11β,17α,21-triol-3,20-dione.

8. A process according to claim 4 in which the substrate steroid is 9α-fluoro-4-pregnene-11β,17α,21-triol-3,20-dione-21 acetate and the recovered product is 9α-fluoro-1,4-pregnadiene-11β,17α,21-triol-3,20-dione.

9. A process according to claim 4 in which the substrate steroid is 4-pregnene-11β,16α,17α,21-tetrol-3,20-dione and the recovered product is 1,4-pregnadiene-11β,16α,17α,21-tetrol-3,20-dione.

10. A process according to claim 4 in which the substrate steroid is 4-pregnene-17α,21-diol-3,20-dione and recovered product is 1,4-pregnadiene-17α,21-diol-3,20-dione.

11. A process according to claim 4 in which the substrate steroid is 4-pregnene-16α,17α,21-triol-3,20-dione and the recovered product is 1,4-pregnadiene-16α,17α,21-triol-3,20-dione.

12. A process according to claim 4 in which the substrate steroid is 4-pregnene-21-ol-3,20-dione and the recovered product is 1,4-pregnadiene-21-ol-3,20-dione.

13. A process according to claim 4 in which the substrate steroid is 4-pregnene-16α,21-diol-3,20-dione and the recovered product is 1,4-pregnadiene-16α,21-diol-3,20-dione.

14. A process according to claim 4 in which the substrate steroid is (16α,17α-epoxy-desoxycorticosterone-21-acetate) 4-pregnane-16α,17α-epoxy-21-ol-3,20-dione-21 acetate and the recovered product is 1,4-pregnadiene-16α,17α-epoxy-21-ol-3,20-dione.

15. A process according to claim 4 in which the substrate steroid is 4-pregnene-3,20-dione and the recovered product is 1,4-pregnadiene-3,20-dione.

16. A process according to claim 4 in which the substrate steroid is (11α-hydroxy-16α,17α-epoxy-progesterone) 4-pregnene-16α,17α-epoxy-11α-ol-3,20-dione and the recovered product is 1,4-pregnadiene-16α,17α-epoxy-11α-ol-3,20-dione.

17. A process according to claim 4 in which the substrate steroid is 4-pregnene-11α-ol-3,20-dione and the recovered product is 1,4-pregnadiene-11α-ol-3,20-dione.

18. A process according to claim 4 in which the substrate steroid is 9α-fluoro-4-pregnene-11β,16α,17α,21-tetrol-3,20-done and the recovered product is 9α-fluoro-1,4-pregnadiene-11β,16α,17α,21-tetrol-3,20-dione.

References Cited in the file of this patent

UNITED STATES PATENTS 2,793,164   Fried et al. _____ May 21, 1957

OTHER REFERENCES

Prescott et al.: Industrial Microbiology, McGraw-Hill Book Co., Inc., 1959, pp. 725, 726 and 749.

Bergey's Manual 6th edition, Williams & Wilkins Co., 1948, pp. 915 and 918.

Bergey's Manual, 7th edition, Williams and Wilkins Co., 1957, p. 1018.